United States Patent
Kim et al.

(10) Patent No.: US 7,647,608 B2
(45) Date of Patent: Jan. 12, 2010

(54) DIGITAL BROADCAST SIGNAL, DIGITAL TELEVISION RECEIVER, AND METHOD OF PROCESSING DIGITAL BROADCAST SIGNAL

(75) Inventors: So Young Kim, Seoul (KR); Kyung Mee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 536 days.

(21) Appl. No.: 11/432,342

(22) Filed: May 12, 2006

(65) Prior Publication Data

US 2007/0214472 A1 Sep. 13, 2007

(30) Foreign Application Priority Data

Mar. 9, 2006 (KR) .............. 10-2006-0022424

(51) Int. Cl.
H04N 7/16 (2006.01)
H04N 7/20 (2006.01)

(52) U.S. Cl. .................. 725/28; 725/67; 725/70

(58) Field of Classification Search ............ 725/67, 725/68, 70, 71, 54, 28, 29
See application file for complete search history.

(56) References Cited

U.S. PATENT DOCUMENTS

| 5,828,402 A | 10/1998 | Collings |
| 6,295,541 B1 * | 9/2001 | Bodnar et al. ............ 707/203 |
| 2005/0166227 A1 * | 7/2005 | Joshi ..................... 725/38 |
| 2005/0210501 A1 * | 9/2005 | Zigmond et al. .......... 725/32 |

FOREIGN PATENT DOCUMENTS

WO WO 2005/125200 A1 12/2005

OTHER PUBLICATIONS

Advanced Television Systems Committee. Program and System Information Protocol for Terrestrial Broadcast and Cable (Revision A). Doc. A/65A. Washington, DC. May 31, 2000.*
"Downloadable U.S. Region Rating System White Paper," Consumer Electronics Association, Dec. 15, 2005, 7 pages.
"U.S. and Canadian Rating Region Tables (RRT) and Content Advisory Descriptors for Transport of Content Advisory Information using ATSC Program and System Information Protocol (PSIP)," ANSI/CEA Standard, ANSI/CEA-766-C, Apr. 2008, Consumer Electronics Association, 16 pages.

* cited by examiner

Primary Examiner—Benny Q Tieu
Assistant Examiner—Oleg Roytburd
(74) Attorney, Agent, or Firm—McKenna Long & Aldridge

(57) ABSTRACT

A digital broadcast signal for use in a digital television receiver includes a rating region table carrying rating information for multiple geographical regions, and a master guide table carrying information related to the rating region table. The master guide table includes a version number field defining a version number of the rating region table and at least one effective time field defining an effective time of the version number. The effective time represents a time after which a use of the rating region table is permitted. For example, it may be represented by a number of global positioning system (GPS) seconds since a coordinated universal time (UTC). The effective time field is included in a descriptor within the master guide table.

16 Claims, 7 Drawing Sheets

FIG. 1

| Syntax | No. of Bits | Format |
|---|---|---|
| master_guide_table_section() { | | |
|   table_id | 8 | 0xC7 |
|   section_syntax_indicator | 1 | '1' |
|   private_indicator | 1 | '1' |
|   reserved | 2 | '11' |
|   section_length | 12 | uimsbf |
|   table_id_extension | 16 | 0x0000 |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   protocol_version | 8 | uimsbf |
|   tables_defined | 16 | uimsbf |
|   for(i=0; i<tables_defined; i++) { | | |
|     table_type | 16 | uimsbf |
|     reserved | 3 | '111' |
|     table_type_PID | 13 | uimsbf |
|     reserved | 3 | '111' |
|     table_type_vesion_number | 5 | uimsbf |
|     number_bytes | 32 | uimsbf |
|     reserved | 4 | '1111' |
|     table_type_descriptors_length | 12 | uimsbf |
|     for(k=0; k<N; k++) { | | |
|       descriptor() | | |
|     } | | |
|   } | | |
|   reserved | 4 | '1111' |
|   descriptors_length | 12 | uimsbf |
|   for(i=0; i<N; i++) { | | |
|     descriptor() | | |
|   } | | |
|   CRC_32 | 32 | rpchof |
| } | | |

FIG. 2A

| Syntax | No. of Bits | Format |
|---|---|---|
| version_effective_time_descriptor() { | | |
| descriptor_tag | 8 | 0x?? |
| descriptor_length | 8 | uimsbf |
| year | 16 | uimsbf |
| month | 8 | uimsbf |
| day | 8 | uimsbf |
| } | | |

FIG. 2B

| Syntax | No. of Bits | Format |
|---|---|---|
| version_effective_time_descriptor() { | | |
| descriptor_tag | 8 | 0x?? |
| descriptor_length | 8 | uimsbf |
| effective_time | 32 | uimsbf |
| } | | |

FIG. 3

| Syntax | No. of Bits | Format |
|---|---|---|
| ration_region_table_section() { | | |
|    table_id | 8 | 0xCA |
|    section_syntax_indicator | 1 | '1' |
|    private_indicator | 1 | '1' |
|    reserved | 2 | '11' |
|    section_length | 12 | uimsbf |
|    table_id_extension { | | |
|      reserved | 8 | 0xFF |
|      rating_region | 8 | uimsbf |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    rating_region_name_length | 8 | uimsbf |
|    rating_region_name_text() | var | |
|    dimensions_defined | 8 | uimsbf |
|    for(i=0;i<dimensions_defined;i++) { | | |
|      dimension_name_length | 8 | uimsbf |
|      dimension_name_text() | var | |
|      reserved | 3 | '111' |
|      graduated_scale | 1 | bslbf |
|      values_defined | 4 | uimsbf |
|      for(j=0;j<values_defined;j++) { | | |
|        abbrev_rating_value_length | 8 | uimsbf |
|        abbrev_rating_value_text() | var | |
|        rating_value_length | 8 | uimsbf |
|        rating_value_text() | var | |
|      } | | |
|    } | | |
|    reserved | 6 | '111111' |
|    descriptors_length | 10 | uimsbf |
|    for(i=0;i<N;i++) { | | |
|      descriptor() | | |
|    } | | |
|    CRC_32 | 32 | rpchof |
| } | | | ns.
DIGITAL BROADCAST SIGNAL, DIGITAL TELEVISION RECEIVER, AND METHOD OF PROCESSING DIGITAL BROADCAST SIGNAL

This application claims the benefit of the Korean Patent Application No. 10-2006-0022424, filed on Mar. 9, 2006, which is hereby incorporated by reference as if fully set forth herein.

BACKGROUND OF THE INVENTION

1. Field of the Invention

The present invention relates to a digital broadcast signal, and more particularly, to a digital broadcast signal, a digital television receiver and method of processing digital broadcast signal.

2. Discussion of the Related Art

In digital broadcast, a program and system information protocol (hereinafter referred to as "PSIP") is a protocol used for tuning channels and transmitting program schedules in an advanced television systems committee (ATSC), which is a digital broadcast standard in a terrestrial and cable digital broadcast environment. More specifically, the PSIP is a standard protocol for transmitting tables which are included in packets transmitted by a multiplexed transport stream. Herein, a plurality of tables each having a specific object (or purpose) is defined in the PSIP. Basically, the tables are structured in sections, such as the table defined in a program system information (PSI) of moving picture expert group (MPEG) data. In other words, each table of the PSIP is formed to have a section structure in order to be transmitted. Herein, depending upon the table type, each table may be configured in a single section or a plurality of sections.

The tables of the PSIP include a virtual channel table (VCT), a system time table (STT), a master guide table (MGT), a rating region table (RRT), an event information table (EIT), and an extended text table (ETT). More specifically, the VCT provides information on a virtual channel, and the STT provides information on the current date and time. The MGT includes a packet identifier (PID) value and version number for each of the PSIP table except for the STT. The RRT provides rating information related to the contents of the program. The EIT provides information on the title and starting time of a program for all channels within the VCT during at least 3 hours. And, the ETT provides detailed description on the background, synopsis, characters, and so on, of a particular program.

Among the above-described tables, the RRT provides program rating information related to several regions. Herein, each RRT defined in accordance with the program rating information includes rating system information of a particular region. Furthermore, the RRT is a standard table of a 'Content_Advisory_Descriptor', which indicates event schedules and program ratings existing in the EIT or the PMT, wherein information of each event is included.

However, the related art digital broadcast signal including the RRT, and the method and apparatus for processing the same have the following advantages. The digital broadcast signal only includes RRTS having fixed rating information. Thus, downloadable RRTs are not supported. Therefore, a method and apparatus for receiving and processing the digital broadcast signal cannot be realized. Furthermore, if the RRT is downloadable, the receiver should determine which of the RRTs received by each channel is the most recent version and, therefore, valid, by checking the version number. However, since there are no specific standard, it is difficult to make such determination in the related art.

SUMMARY OF THE INVENTION

Accordingly, the present invention is directed to a digital broadcast signal, a method for transmitting and receiving the same, and a digital television receiver that substantially obviate one or more problems due to limitations and disadvantages of the related art.

An object of the present invention is to provide a digital broadcast signal, a method for transmitting and receiving the same, and a digital television receiver that includes a downloadable rating region table (RRT).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital broadcast signal for use in a digital television receiver includes a rating region table and a master guide table. The rating region table carries rating information for multiple geographical regions, and the master guide table carries basic information related to the rating region table. The master guide table includes a version number field defining a version number of the rating region table and at least one effective time field defining an effective time of the version number. This effective time field may be included in a descriptor within the master guide table.

The effective time of the version number represents a time after which a use (e.g., download) of the rating region table is permitted. The effective time may be represented by a number of global positioning system (GPS) seconds since a coordinated universal time (UTC). Alternatively, the effective time may be represented by year, month, and day.

In another aspect of the present invention, a method of processing a digital broadcast signal in a digital television receiver initially includes the step of receiving a digital broadcast signal which includes a rating region table carrying rating information for multiple geographical regions and a master guide table carrying information related to the rating region table. Next, the master guide table is parsed from the digital broadcast signal. The parsed master guide table includes a version number field defining a version number of the rating region table and at least one effective time field defining an effective time of the version number. If a current system time is before the effective time of the version number, the receiver is prohibited from the use of the rating region table. Therefore, the rating region table is discarded if a current system time is before the effective time of the version number.

In addition, the version number of the rating region table may be compared with a version number of a pre-stored rating region table. The rating region table may be parsed and stored when the rating region table is determined to be newer than the pre-stored rating region table based on their version numbers.

In another aspect of the present invention, a digital television receiver includes a tuner, a demodulator, a demultiplexer, a decoder, and a controller. The tuner receives a digital broadcast signal which includes a rating region table carrying rating information for multiple geographical regions and a master guide table carrying information regarding the rating region table. The demodulator demodulates the digital broadcast signal, and the demultiplexer demultiplexes the rating region table and the master guide table from the digital broadcast signal. The decoder parses the master guide table, where the parsed master guide table includes a version number field defining a version number of the rating region table and at least one effective time field defining an effective time of the version number. Finally, the controller generates control signals to discard the rating region table when a current system time is before the effective time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates an example of a bit stream syntax for a master guide table (MGT) according to the present invention;

FIG. 2A illustrates an example of a newly defined descriptor in the bit stream syntax for the MGT according to the present invention;

FIG. 2B illustrates another example of a newly defined descriptor in the bit stream syntax for the MGT according to the present invention;

FIG. 3 illustrates an example of a bit stream syntax for a rating region table (RRT) according to the present invention;

DETAILED DESCRIPTION OF THE INVENTION

Figure 4:
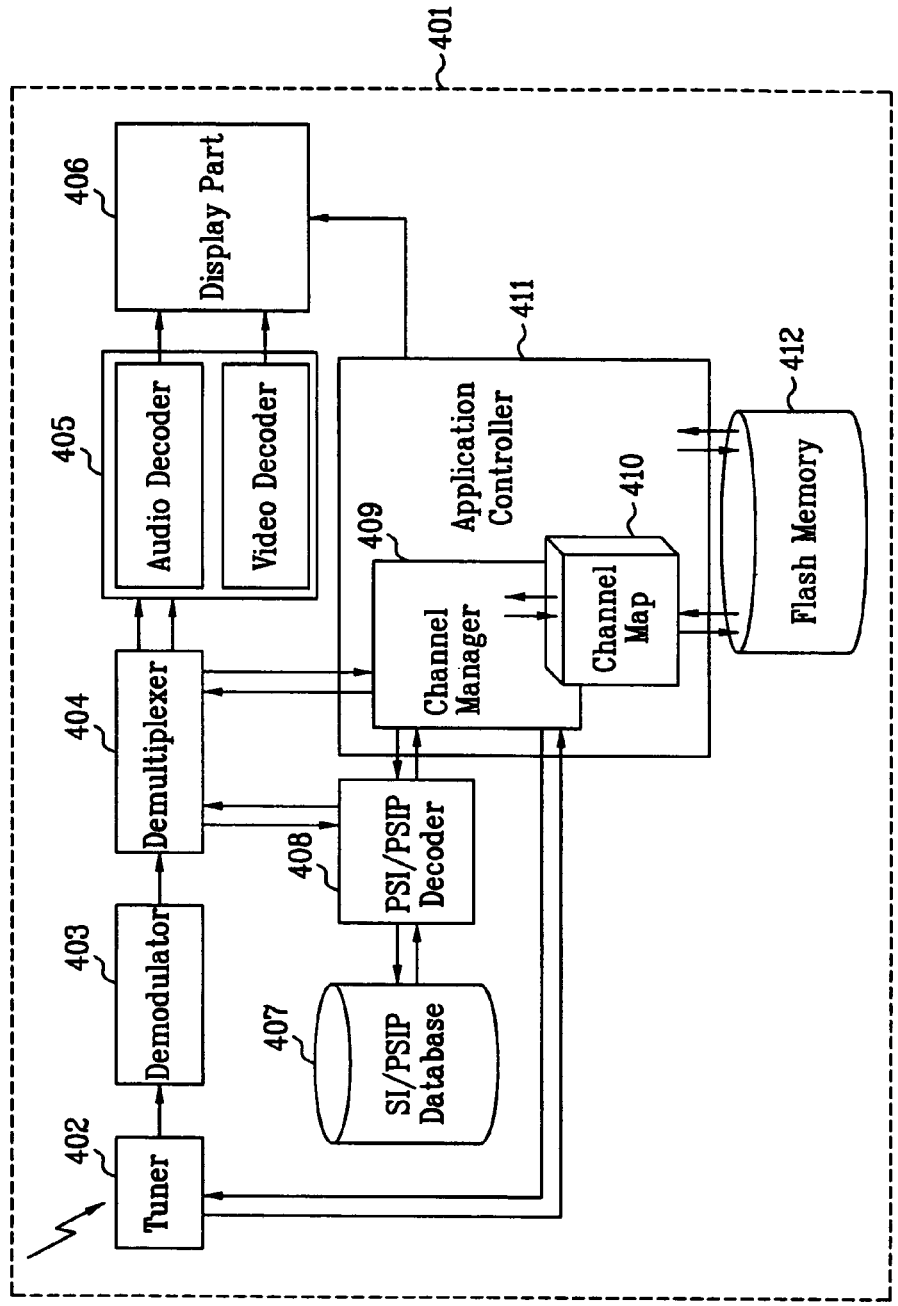
FIG. 4 illustrates a block diagram of a digital television receiver receiving the RRT according to the present invention.

Reference will now be made in detail to the preferred embodiments of the present invention, examples of which are illustrated in the accompanying drawings. Wherever possible, the same reference numbers will be used throughout the drawings to refer to the same or like parts.

More specifically, the digital broadcast signal according to the present invention is devised to solve problems that may occur due to a frequent change in the RRT version information or due to each broadcast station having the RRT version number modified at different time periods. In order to resolve such problems, the receiver according to the present invention includes effective time information on the RRT version information. The effective time information may include the time after which a use of the rating region table is permitted or the time which the use of the rating region table is limited (or prohibited). Hereinafter, a version number will be used as the version information.

Furthermore, in the present invention, a master guide table (MGT) is used to include the effective time information in the broadcast signal. The MGT includes a packet identifier (PID) value and version number for each of the PSIP table except for the STT, which provides information on the current date and time. Therefore, by separately defining effective time information on the RRT version within the MGT, the receiver is controlled so that a new version RRT is not received at least during the corresponding period, thereby preventing the version number from being updated too frequently.

FIG. 1 illustrates an example of a bit stream syntax for a master guide table (MGT) according to the present invention. Hereinafter, the MGT bit stream syntax will be described in detail with reference to FIG. 1. Furthermore, in order to simplify the description of the present invention, each field name of the syntax will be marked with quotation marks (e.g., "XXX_YYY_ZZZ").

The structure of a section which is configured by a combination of data structures will first be described prior to the description of the MGT bit stream syntax. According to the present invention, all of the sections of the tables included in the PSIP begin with a "table_id" field and end with a "CRC_32" field. Each section is divided into a header, a body, and a trailer. The header has a configuration common to all sections. And, the actual data is recorded in the body depending upon the object of the table section. Finally, the trailer checks and corrects the errors that may occur in the table section. More specifically, the header part begins from the "table_id" field to a "protocol_version" field. The body part begins from a "tables_defined" field to a "descriptors_length" field. The trailer consists of the "CRC_32" field. The description of the MGT will be divided into the header, the body, and the trailer.

In the header, a "table_id" field is an 8-bit field which shall be set to '0xC7', identifying the table as a master guide table (MGT). A "section_syntax_indicator" field is a 1-bit field and shall be set to '1'. This denotes that the section follows the generic section syntax beyond the section length field. A "private_indicator" field is a 1-bit field and shall be set to '1'. A "section_length" field is a 12-bit field specifying the number of remaining bytes in this section immediately following the "section_length" field up to the end of the section. The value of the "section_length" field shall be no larger than 4093.

A "table_id_extension" field is a 16-bit field and shall be set to '0x0000'. A "version_number" field is a 5-bit field and is the version number of MGT. The version number shall be incremented by 1 modulo 32 when any field in the "table_type"s defined field in the loop below or the MGT itself changes. A "current_next_indicator" field is a 1-bit indicator and is always set to '1' for the MGT section. The MGT sent is always currently applicable. A "section_number" field is an 8-bit field, and the value of this field shall always be set to '0x00' (this table is only one section long). A "last_section_number" field is an 8-bit field, and the value of this field shall always be set to '0x00'. A "protocol_version" field is an 8-bit unsigned integer field whose function of which shall be to allow, in the future, this table type to carry parameters that may be structured differently than those defined in the current protocol. Presently, the only valid value for the "protocol_version" field is zero (0). Non-zero values of the "protocol_version" field may be used by a future version of this standard to indicate structurally different tables.

In the body, a "tables_defined" field is a 16-bit unsigned and has a range of 6 to 370 (for terrestrial) and 2 to 370 (for cable). A "table_type" field is a 16-bit unsigned integer and specifies the type of the table. A "table_type_PID" field is a 13-bit field and specifies the PID for the "table_type" field described in the loop. A "table_type_version_number" is a 5-bit field and reflects the version number of the "table_type" field described in the loop. The value of this field shall be the same as the version number entered in the corresponding fields of tables and table instances. For example, the value of this field for EIT-3 will be the same as that of the "version number" field that appears in the actual EIT-3. The version number for the next VCT (current_next_indicator='0') shall be one unit more (modulo 32) than the version number for the current VCT (current_next_indicator='1').

A "number_bytes" field is a 32-bit unsigned integer field and indicates the total number of bytes used for the "table_type" field described in the loop. A "table_type_description_length" field is the total length of the descriptors for the "table_type" field described in the loop (in bytes). A "descriptor)" field has zero (0) or more descriptors, as appropriate, may be included. A "descriptors_length" field is the total length of the MGT descriptor list that follows (in bytes).

Finally, in the trailer, a "CRC_32" field is a 32-bit field that contains the CRC value that ensures a zero (0) output from the registers in the decoder defined in an MPEG-2 Systems after processing the entire master guide table (MGT) section.

According to the present invention, the descriptor field includes effective time information on the version number of the RRT. As shown in FIG. 2A and FIG. 2B, a "version_effective_time_descriptoro" is added so as to define the effective time. At this point, the name of this descriptor is only an exemplary name, and the scope of what is claimed in the present invention should be defined in accordance with the technical spirit denoted within the description of the present invention.

FIG. 2A illustrates an example of a newly defined descriptor in the bit stream syntax for the MGT according to the present invention. And, FIG. 2B illustrates another example of a newly defined descriptor in the bit stream syntax for the MGT according to the present invention. Hereinafter, the descriptor will be described in detail with reference to FIG. 2A and FIG. 2B.

Referring to FIG. 2A, the descriptor may include a "descriptor_tag" field, a "descriptor_length" field, a "year" field, a "month" field, and a "day" field. The "descriptor_tag" field is an 8-bit field. When this field is given a specific value, this may indicate that the corresponding descriptor is used as the "version_effective_time_descriptor( )". The "year", "month", and "day" fields respectively denote a year, month, and day, so as to indicate the effective time according to the present invention. Herein, the total size of the "year", "month", and "day" fields is 32 bits, i.e., 16 bits, 8 bits, and 8 bits, respectively.

Referring to FIG. 2B, the descriptor may include a "descriptor_tag" field, a "descriptor_length" field, and an "effective_time" field. The description of the "descriptor_tag" field and the "descriptor_length" field is identical to that of FIG. 2A and will, therefore, be omitted for simplicity. The "effective_time" field is a 32-bit field having the value of an unsigned integer. The "effective_time" field corresponds to the "year", "month", and "day" fields of FIG. 2A. More specifically, for example, the effective time is expressed by a number of global positioning system (GPS) seconds since a coordinated universal time (UTC).

The effective time is decided from a signal transmitter and a signal receiver in order to provide a broadcast signal being transmitted and received with time information that can allow a current version RRT to be newly updated. For example, the effective time can be set to 'Jan. 1, 2006, 09:00:00' or "Mar. 1, 2006". As described above, information on the effective time is described by using descriptors of the MGT, as shown in FIG. 2A and FIG. 2B. However, the present invention is not limited to this description only and may also be defined as described above by using a reserved field of the MGT.

As described above, by using the MGT descriptor information to indicate the effective time, the validity of the RRT that is transmitted in the present invention can be determined. More specifically, by using the version effective time descriptor, the receiver can determine the validity of a pre-stored (or already received) RRT without having to go through a parsing process, even before verifying the contents of the RRT that is being received. The present invention is advantageous in that the broadcast signal can be processed in accordance with the verified validity of the RRT version. Also, by defining the information on the effective time, limitations can be set so as to prevent the version from being changed too frequently or modified arbitrarily by a transmitting end. Thus, for the viewers (or users), problems related to confusion in the RRT contents caused by the frequent change in versions can be prevented. Furthermore, according to the present invention, all broadcasters (or broadcast transmitters) should transmit information of the RRT version so that the RRT version is not changed frequently within the effective time.

As described above, when the receiver receives a new RRT, after the effective time of the previous RRT is passed, the receiver should update the database with the newly RRT. Prior to updating the database, the receiver first determines whether there has been a previous update. In the present invention, in determining whether there has been a previous update, the receiver compares the version number of the received RRT with the version number of a pre-stored RRT. Then, if the compared result is within a predetermined range, the receiver determines the newly RRT to be the most recent version and performs the update accordingly. Herein, it is preferable that the difference between the two version numbers (i.e., the compared result) should be at least 2 or more. Thus, the receiver can perform the proper operations when the transmitter transmits the wrong RRT.

A rating region table (RRT) syntax for determining whether there has been an update will now be described. FIG. 3 illustrates an example of a bit stream syntax for a rating region table (RRT) according to the present invention. The syntax configuring the RRT will be described in order. Additionally, to simplify the description of the first embodiment of the present invention, each field name of the syntax will be marked with quotation marks (e.g., "XXX_YYY_ZZZ"). Furthermore, in describing the RRT syntax, detailed description of the fields identical to those of the MGT syntax, shown in FIG. 1, will be omitted for simplicity. Hereinafter, only the fields that are not mentioned in FIG. 1 will be described in detail.

In the present invention, section-filtering is performed by using a "table_id_extension" field and a "version_number" field located at a header of the RRT. A "rating_region" field existing in the "table_id_extension" field includes rating region information of the RRT. The "rating_region" field is an 8-bit unsigned integer number that defines the rating region to be associated with the text in a "rating_region_table_section( )". The value of this field is the identifier of the rating region, and thus the field may be used by the other tables (e.g., MGT) for referring to a specific rating region table. A "rating_region" field value of '0x01' shall not be used. This field shall only contain values within the range of '0x01' to '0xFF' that have been defined by the ATSC. Herein, the ATSC should be contacted for current assignment of values for the "rating_region" field.

For example, when the value of the "rating_region" field is '0x05', this indicates that the RRT is a downloadable RRT according to the present invention. Therefore, by setting the "rating_region" field value, which exists in the "table_id_extension" field, as a filtering condition only the downloadable RRT can be received among the RRT that are being received. In other words, by using the "rating_region" field, the receiver can determine whether a downloadable RRT is included in a broadcast signal that is being received.

Moreover, a "version_number" field is a 5-bit field and is the version number of the RRT identified by a combination of the "table_id" field and the "table_id_extension" field. The version number shall be incremented by 1 modulo 32 when any field in the given RRT changes. The value of this field shall be the same as that of the corresponding entry in the MGT. In the present invention, the "version_number" field is set as a filtering condition. If a pre-stored RRT does not exist, the receiver receives the RRT that being received and stores the version number that is included in the RRT. Alternatively, if a pre-stored RRT exists, the version number of the RRT that is being received is compared with the version number of the pre-stored RRT. Then, based upon the comparison, the receiver is set to receive the RRT only when the difference between the two version numbers is within a predetermined range.

In setting the filtering condition, if the version number of the RRT that is being received is lower than or the same as the version number of the pre-stored RRT, the RRT determines that the RRT that is being (or to be) received is not a new version. Also, if the version number of the RRT is higher than the predetermined range, the RRT is also determined not to be a new version. In other words, the receiver determines that the RRT is a new version that can update the version number only when the difference between the two version numbers is within a specific range. It is preferable that the difference range consists of at least 2 version numbers. Therefore, the receiver first compares the version number of RRT that is to be received and the version number of the RRT that already exists in the receiver. Thereafter, if the difference is beyond (or larger than) the predetermined range, the receiver performs section-filtering by determining that the RRT is incorrectly sent or that the RRT is no longer valid and, then, by discarding the corresponding RRT.

Alternatively, if the version number of the RRT to be received is lower than or the same as the pre-stored RRT, the receiver determines that the RRT is not a new (or recent) version and, therefore, that an update is not required. In this case also, the receiver discards RRT that is being received, as in the case when the difference in the version numbers exceeds the predetermined range.

As described above, the receiver may perform section-filtering of the RRT by using the "table_id_extension" field and the "version_number" field of FIG. 3. When the section-filtering is performed, the receiver is capable of receiving only the most recent version RRT. Further, the "version_number" field is within the range of from 0 to 31 by modulo 32. Thus, the cycle (or rotation) of the "version_number" field ranges between 0 and 31. In comparing and updating the version numbers, if the version number of the RRT being received is lower than the version number of the pre-stored RRT, the receiver does not automatically discard the corresponding RRT but considers version number '0' of the second cycle (or rotation), which follows version number '31' of the first cycle. In other words, if the version number of the RRT being received is '0' and the version number of the pre-stored RRT is '31', and if the predetermined version number difference range is '1', then the receiver should determine the RRT being received to be a new (or recent) version RRT. Therefore, according to the present invention, even if the transmitter accidentally transmits a very old version RRT, the receiver is set so that it does not confuse the very old version RRT with a recent version RRT, thereby preventing confusion in the RRT versions from occurring due to a wrap around of the RRT version numbers.

Accordingly, in the present invention, the original (or pre-stored) RRT structure can be maintained while incorrect version numbers can be filtered out. Moreover, if the RRT that is being received has the same version number as the pre-stored RRT, the receiver assumes that the RRTs have the same contents, e.g., dimension. Once such assumption is made, the object of the present invention can be achieved by section-filtering the RRT from the header. In other words, the receiver can perform section-filtering of only the header, without having to parse up to the body of the RRT so as to compare each of the corresponding contents individually, in order to separately achieve the object of the present invention.

In the body of the RRT according to the present invention, a "rating_region_name_length" field is an 8-bit unsigned integer number that defines the total length (in bytes) of the "rating_region_name_text( )" field that is to follow. A "rating_region_name_text( )" field is a data structure containing a multiple string structure which represents the rating region name associated with the value given by the "rating_region" field. A "dimensions_defined" field is an 8-bit field (1-255), which specifies the number of dimensions defined in the "rating_region_table_section( )" field. The "dimensions_defined" field is configured in a loop structure. The loop begins with a "dimension_name_length" field and ends with a "values_defined" field, which will be described later on.

Hereinafter, the fields within the loop of the "dimensions_defined" field will now be described in detail. A "dimension_name_length" field is an 8-bit unsigned integer number that defines the total length in bytes of a "dimension_name_text( )" field that is to follow. The "dimension_name_text( )" field is a data structure containing a multiple string structure which represents the dimension name being described in the loop.

A "graduated_scale" field is a 1-bit flag, which indicates whether or not the rating values in this dimension represent a graduated scale, i.e., higher rating values represent increasing levels of rated content within the dimension. Herein, value '1' means 'yes', while value '0' means 'no'. A "values_defined" field is a 4-bit field (1-15) which specifies the number of values defined for this particular dimension. Herein, the "values_defined" field has another loop structure starting from a "abbrev_rating_value_length" field to a "rating value_text( )" field, which exist within the loop of the "values_defined" field.

Hereinafter, the fields within the loop of the "values_defined" field will now be described in detail. An "abbrev_rating_value_length" field is an 8-bit unsigned integer number that defines the total length (in bytes) of an "abbrev_rating_value_text( )" field that is to follow. The "abbrev_rating_value_text( )" field is a data structure containing a multiple string structure which represents the abbreviated name for one particular rating value.

A "rating_value_length" field is an 8-bit unsigned integer number that defines the total length (in bytes) of a "rating value_text( )" field that is to follow. The "rating_value_text( )" is a data structure containing a multiple string structure which represents the full name for one particular rating value. A "descriptors_length" field the length (in bytes) of all of the descriptors that follow this field. As for a "descriptor( )" field, zero (0) or more descriptors, as appropriate, may be included.

An apparatus and method for transmitting and receiving a digital broadcast signal according to the present invention will now be described. FIG. 4 illustrates a block diagram of a digital television receiver receiving the RRT according to the present invention. A digital television receiver according to the present invention, which receives and processes the RRT, will now be described with reference to FIG. 4.

A digital television receiver 401 according to the present invention includes a tuner 402, a demodulator 403, a demultiplexer 404, an A/V decoder 405, a display part 406, a SI/PSIP database 407, a PSI/PSIP decoder 408, a channel manager 409, a channel map 410, an application controller 411, and a flash memory 412.

The tuner 402 may receive a digital broadcast signal including a program specific information/program and system information protocol (PSI/PSIP) table. Herein, the received PSIP table includes a rating region table (RRT). And, the operations of the tuner 402 may be controlled by the channel manager 409. The tuner 402 can record the result of the received digital broadcast signal in the channel manager 409. The demodulator 403 demodulates the tuned signal received from the tuner 402 to a vestigial sideband/enhanced vestigial sideband (VSB/EVSB) signal.

The demultiplexer 404 demultiplexes the demodulated signal received from the demodulator 303 to audio data, video data, and PSI/PSIP table data. The demultiplexing of the audio data and video data may be controlled by the channel manager 409. On the other hand, the demultiplexing of the PSI/PSIP table data may be controlled by the PSI/PSIP decoder 408. The demultiplexer 404 transmits demultiplexed PSI/PSIP table to the PSI/PSIP decoder 408 and transmits the demultiplexed audio data and video data to the A/V decoder 405. Thereafter, the A/V decoder 405 receives the data from the demultiplexer 404 and decodes the received data.

The PSI/PSIP decoder 408 parses a PSI/PSIP section and reads all remaining actual section data parts which the demultiplexer 404 did not filter during the section-filtering, thereby recording the data in the SI/PSIP database 407. The channel manager 409 refers to the channel map 410 and requests the reception of a channel related information table. Then, the channel manager 409 receives the results.

At this point, the PSI/PSIP decoder 408 controls the demultiplexing of the channel related information table and transmits an A/V PID list to the channel manager 409. The channel manager 409 uses the A/V PID received from the PSI/PSIP decoder 408 to directly control the demultiplexer 404, thereby controlling the A/V decoder 405. Furthermore, the application controller 411 controls a graphical user interface (GUI) which displays the condition (or state) of the digital television receiver system on an on-screen display (OSD).

More specifically, according to the present invention, the demultiplexer 404 uses the PID, table ID (table_id), version number (version_number), section number (section_number), and table ID extension (table_id_extension), so as to check a header part of the PSIP table being transmitted from a transmitting end (e.g., a broadcast station). At this point, the demultiplexer 404 filters a desired table section. For example, the demultiplexer 404 filters a RRT section. The PSI/PSIP decoder 408 determines the version number of the filtered RRT and parses the RRT so as to check (or verify) whether the RRT has been updated. Thereafter, the contents of the parsed RRT, i.e., the version number of the RRT, are compared with those (i.e., the version number) of a RRT pre-stored in the flash memory 412. The update of the RRT is determined based upon the compared result between the two version numbers.

In deciding based upon the compared result whether there has been an update in the RRT, the values defined in the "version_number" field in the RRT syntax (shown in FIG. 3) are parsed. Thereafter, the parsed version number is compared with the version number of the pre-stored RRT, thereby checking whether the difference between the two version numbers exceed a predetermined range. Herein, it is preferable that the range of the difference between the two version numbers is at least '2' or more.

Accordingly, based upon the comparison, if the difference between the two version numbers exceeds the predetermined range, the receiver determines either that a wrong version RRT has been sent or that the validity of the received RRT has expired (i.e., no longer valid). Thus, the received discards the received RRT. Conversely, if the difference between the two version numbers is within the predetermined range, the receiver determines the received RRT to be of a recent version. Thereafter, the received RRT is stored in the SI/PSIP database 407, thereby updating (or upgrading) the RRT.

The demultiplexer 404 uses the header of the RRT within the PSI/PSIP table to compare the version number of the RRT that is being received with the version number of the pre-stored RRT. Accordingly, the demultiplexer 404 performs section-filtering so that the receiver can receive the RRT having the most recent version number. Thereafter, the demultiplexer 404 transmits the data corresponding to each section configured by the section-filtering process to the corresponding decoder. Subsequently, the PSI/PSIP decoder 408 determines whether the version number of the RRT, which has been section-filtered by the demultiplexer 404, is a recent number. Then, the PSI/PSIP decoder 408 determines whether the predetermined effective time of the receiver has been updated prior to the update of the version number. If the predetermined effective time is determined to have been updated, the transmission of the section-filtered RRT is considered to be incorrect. Therefore, the corresponding RRT is discarded.

Figure 5:
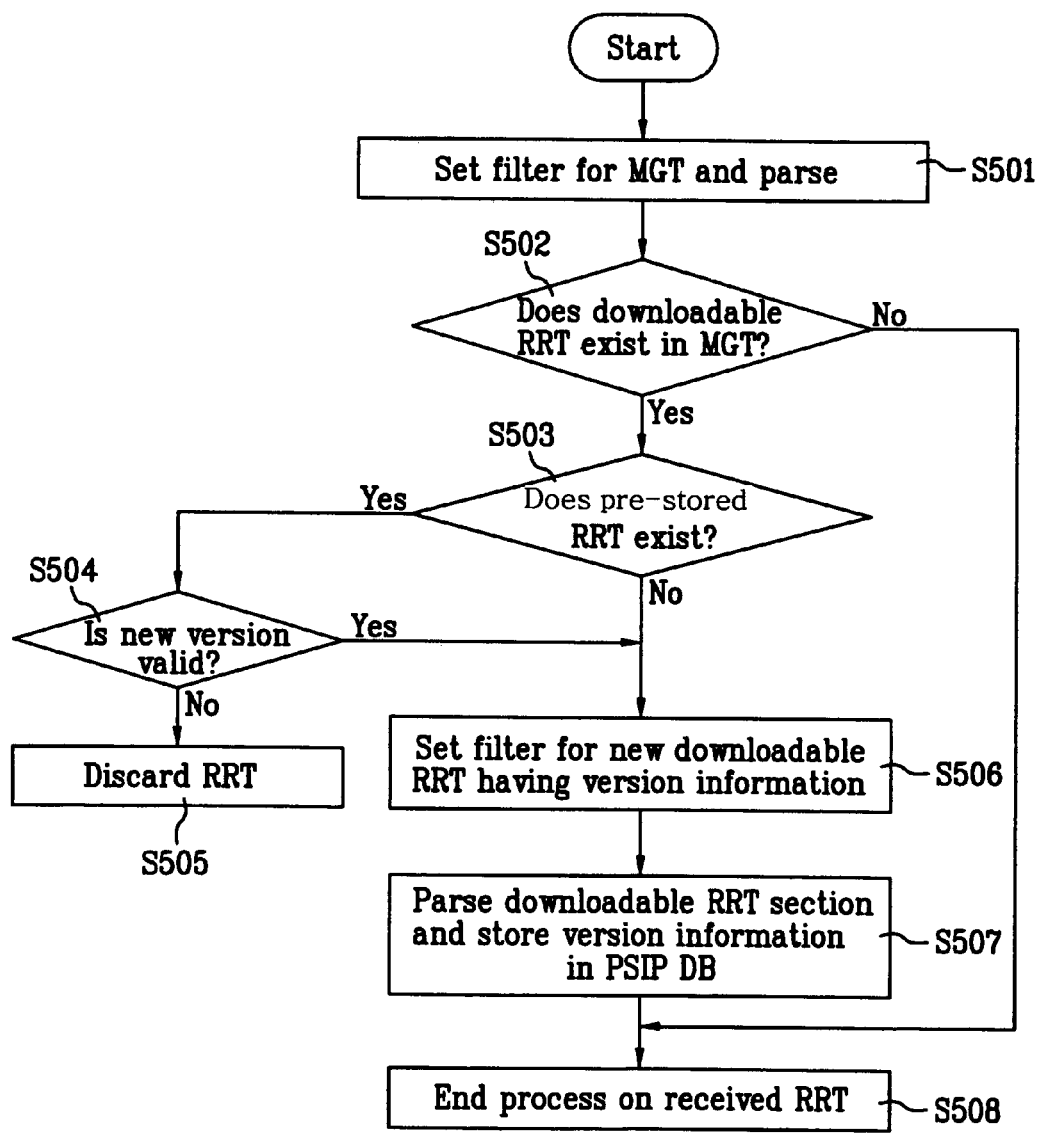
FIG. 5 illustrates a flow chart of a first example of a method for processing the RRT according to the present invention.
Figure 6:
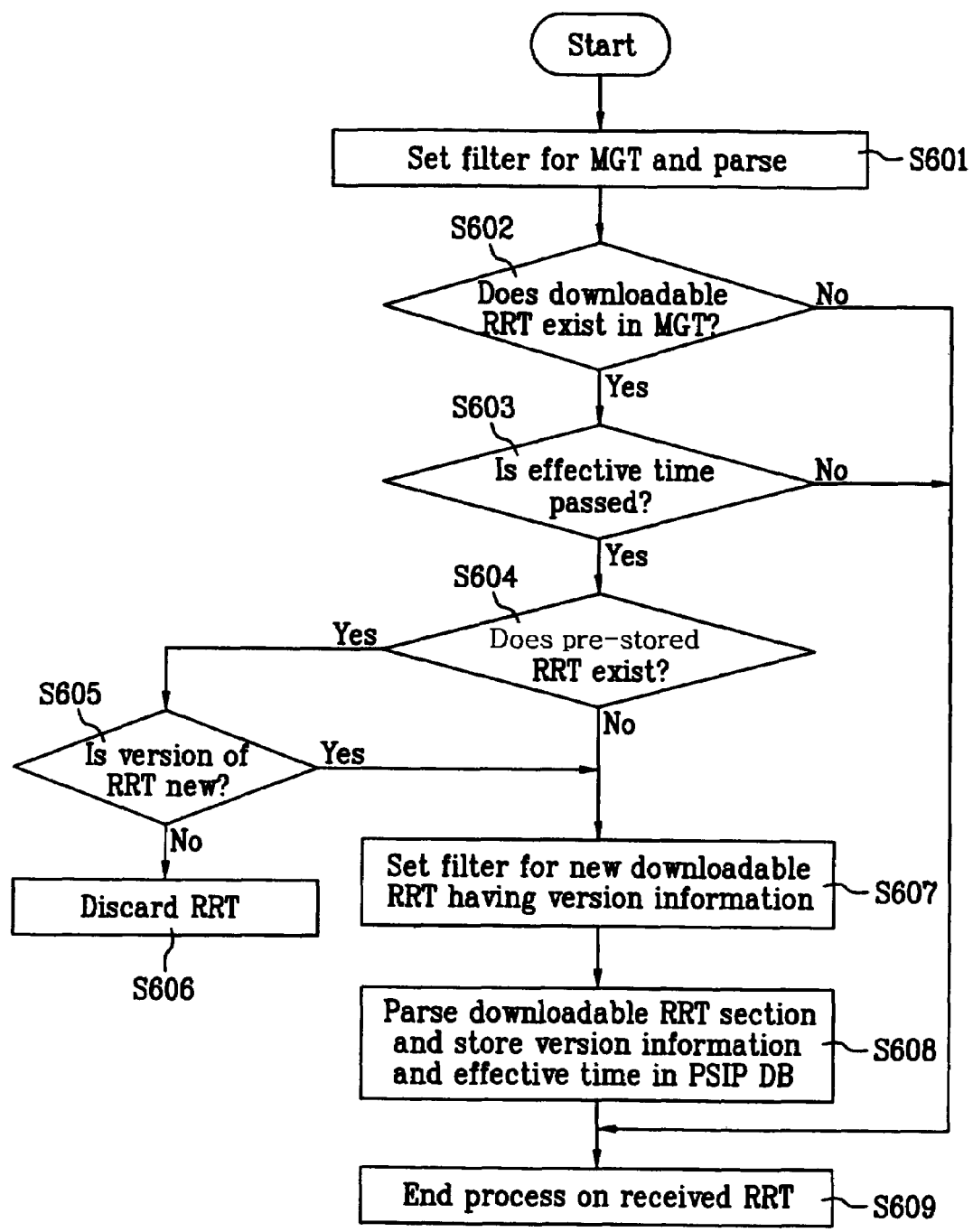
FIG. 6 illustrates a flow chart of a second example of a method for processing the RRT according to the present invention.
Figure 7:
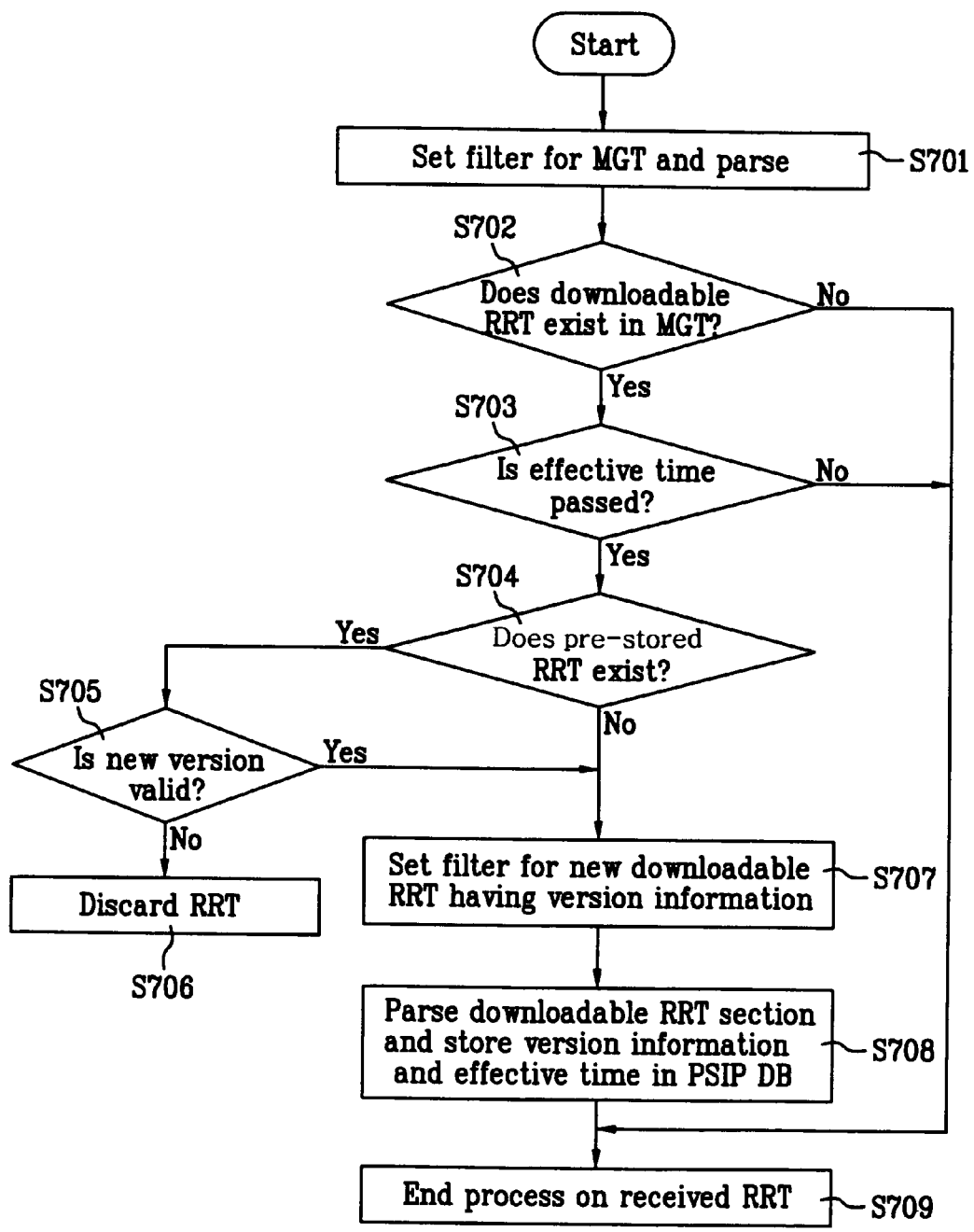
FIG. 7 illustrates a flow chart of a third example of a method for processing the RRT according to the present invention.

In the method for transmitting and receiving a digital broadcast signal by using the digital television receiver according to the present invention, FIG. 5 to FIG. 7 illustrate examples of flow charts showing the method for receiving and processing the RRT according to the present invention. Hereinafter, the method for receiving and processing the RRT from the receiver will now be described in detail with reference to FIG. 5 to FIG. 7.

Referring to FIG. 5, the receiver sets filter for the master guide table (MGT) of the digital broadcast signal, and parsing the filtered MGT (S501). Then, the receiver determines whether a downloadable RRT exists in the broadcast signal which is received from the parsed MGT (S502). If it is determined in Step 502 that the downloadable RRT does not exist, all process on the corresponding RRT existing in the broadcast signal is ended. Conversely, if it is determined that the downloadable RRT exists, the receiver determines whether a pre-stored RRT exists in the receiver (S503).

If it is determined in Step 503 that the pre-stored RRT exists in the receiver, then the receiver determines whether the new RRT version included in the broadcast signal is valid (S504). At this point, in determining the validity of the new RRT version, the receiver compares the pre-stored version number with the new version number. Subsequently, the receiver determines the validity of the new RRT version by verifying, based upon the comparison, whether the difference in number between the pre-stored RRT version and the new RRT version is within a predetermined range. Herein, it is preferable that the predetermined range is at least 2 or more.

Based upon the result of Step 504, if the new RRT version number exceeds the predetermined range or is lower than or the same as the pre-stored RRT version number, the receiver determines that the new RRT version is either incorrect or invalid and, therefore, discards the newly RRT (S505). However, if it is determined in Step 503 that a pre-stored RRT does not exist in the receiver, or if it is determined in Step 504 that the difference between the pre-stored and new version numbers is within the predetermined range, then the receiver determines that the newly RRT is valid. Therefore, the filter of the receiver is set for the new downloadable RRT having the valid version number (S506).

Subsequently, the downloadable RRT section that is filtered is parsed, and the version number of the parsed RRT section is stored in the SI/PSIP database (S507). Thereafter, the process on the corresponding RRT that is being received is ended (S508).

Referring to FIG. 6, the receiver sets filter for master guide table (MGT) of the digital broadcast signal, thereby filtering the digital broadcast signal and parsing the filtered MGT (S601). Then, the receiver determines whether a downloadable RRT exists in the broadcast signal which is received from the parsed MGT (S602). If it is determined in Step 602 that the downloadable RRT does not exist, all process on the corresponding RRT existing in the broadcast signal is ended. Conversely, if it is determined that the downloadable RRT exists, the receiver checks, among the descriptors included in the MGT, a descriptor including effective time information on the version number of the RRT (i.e., the version effective time descriptor information), the receiver then determines whether the effective time has passed (S603).

If it is determined in Step 603 that the effective time has not passed, then the receiver ends all process on the corresponding RRT included in the broadcast signal. However, if it is determined in Step 603 that the effective time has passed, then the receiver determines whether a pre-stored RRT exists (S604). If it is determined in Step 604 that the pre-stored RRT exists in the receiver, then the receiver determines whether the RRT version included in the broadcast signal is a new version (S605). At this point, in determining the RRT version, the receiver compares the pre-stored version number with the new version number. Then, based upon the comparison, if the newly RRT version number is lower than or the same as the pre-stored RRT version number, the receiver determines that the newly RRT is not a new (or recent) version. Conversely, if the RRT version number is higher than the pre-stored RRT version number, then the receiver determines that the newly RRT is a new version. More specifically, it is preferable to define a limited difference range. For example, a version is defined to be 'new' only when the difference between the new version number and the pre-stored version number is '1'. In other words, based upon the result of Step 605, if the version of the newly RRT is determined to be old (or not new), then the RRT is discarded (S606).

However, based upon the result of Step 604, if the pre-stored RRT does not exist, or based upon the result of Step 605, if the RRT is a new (or recent) version, sets filter for a new downloadable RRT having the valid version number (S607). Subsequently, the downloadable RRT section that is filtered is parsed, and the descriptor information about the parsed version number and the version number of the received RRT (i.e., the version effective time descriptor information of the pre-parsed MGT) are stored in the SI/PSIP database (S608). Thereafter, the process on the corresponding RRT that is being received is ended (S609).

Finally, referring to FIG. 7, the receiver sets filter for the master guide table (MGT) of the digital broadcast signal, and parsing the filtered MGT (S701). Then, the receiver determines whether a downloadable RRT exists in the broadcast signal which is received from the parsed MGT (S702). If it is determined in Step 702 that the downloadable RRT does not exist, all process on the corresponding RRT existing in the broadcast signal is ended. Conversely, if it is determined that the downloadable RRT exists, the receiver checks, among the descriptors included in the MGT, a descriptor including information on the version number of the RRT (i.e., the version effective time descriptor information), the receiver then determines whether the effective time has passed (S703).

If it is determined in Step 703 that the effective time has not passed, then the receiver ends all process on the corresponding RRT included in the broadcast signal. However, if it is determined in Step 703 that the effective time has passed, then the receiver determines whether a pre-stored RRT exists (S704). If it is determined in Step 704 that the pre-stored RRT exists in the receiver, then the receiver determines whether the RRT version included in the broadcast signal is valid (S705). At this point, in determining the validity of the RRT version, the receiver compares the pre-stored version number with the new version number. Then, based upon the comparison, if the difference between the two version numbers is larger than a predetermined range, then the validity of the new version number can be determined. Preferably, for example, the predetermined range begins from at least 2 or more.

Therefore, if it is determined in Step 705 that the difference between the new version number and the pre-stored version number exceeds the predetermined range, or that the new version number is the same as or lower than the pre-stored version number, the RRT version is determined to be an invalid version number that has been incorrectly transmitted. Thus, the RRT is discarded (S706). However, based upon the result of Step 704, if the pre-stored RRT does not exist, or based upon the result of Step 705, if the difference between the new version number and the pre-stored version number is within the predetermined range, the RRT is determined to be valid. Therefore, the receiver sets filter for a new downloadable RRT having the valid version number (S707). Then, the downloadable RRT section that is filtered is parsed, and the descriptor information about the parsed version number and the version number of the received RRT (i.e., the version effective time descriptor information of the pre-parsed MGT) are stored in the SI/PSIP database (S708). Thereafter, the process on the corresponding RRT that is being received is ended (S709).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital broadcast signal in a digital television receiver, the method comprising:

receiving a digital broadcast signal which includes a rating region table carrying rating information for multiple geographical regions and a master guide table carrying information related to the rating region table;

parsing the master guide table, the parsed master guide table including a version number field defining a version number of the rating region table and at least one effective time field defining an effective time interval of the version number, wherein a process of updating the rating region table is suspended during the effective time interval regardless of the version number;

discarding a subsequently received rating region table during a current system time of the digital television receiver that is before the effective time interval of the version number even though a version number of the subsequently received rating region table has been updated; and determining whether to replace a current rating region table with the subsequently received rating region table when the current system time is after the effective time interval of the version number.

2. The method of claim 1, the determining step further Comprising:

detecting a first difference between a version number of a first rating region table received through a first channel and that of a second rating region table received through a second channel;

detecting a second difference between that of the first rating region table and that of a pre-stored rating region table; and controlling to replace the pre-stored rating region table with the first rating region table if both of the first difference and the second difference are within a predetermined range.

3. The method of claim 1, further comprising:

comparing the version number of the subsequently received rating region table with a version number of a pre-stored rating region table when the current system time is after the effective time interval of the version number; and parsing and storing the subsequently received rating region table when the subsequently received rating region table is determined to be newer than the pre-stored rating region table based on their version numbers.

4. The method of claim 3, further comprising discarding the subsequently received rating region table when the subsequently received rating region table is determined to be not newer than the pre-stored rating information.

5. The method of claim 1, wherein the effective time interval of the version number represents a time interval after which an update of the rating region table is permitted.

6. The method of claim 1, wherein the effective time interval of the version number is represented by a number of global positioning system (GPS) seconds derived from a coordinated universal time (UTC).

7. The method of claim 1, wherein the effective time interval of the version number is represented by year, month, and day.

8. The method of claim 1, wherein the at least one effective time field is included in a descriptor within the master guide table.

9. A digital television receiver, comprising:

a tuner arranged to receive a digital broadcast signal which includes a rating region table carrying rating information for multiple geographical regions and a master guide table carrying information regarding the rating region table;

a demodulator arranged to demodulate the digital broadcast signal;

a demultiplexer arranged to demultiplex the rating region table and the master guide table from the digital broadcast signal;

a decoder arranged to parse the master guide table, the parsed master guide table including a version number field defining a version number of the rating region table and at least one effective time field defining an effective time interval of the version number, wherein a process of updating the rating region table is suspended during the effective time interval regardless of the version number; and a controller arranged to generate control signals to discard a subsequently received rating region table when a current system time of the digital television receiver is before the effective time interval of the version number and determine whether to replace a current rating region table with the subsequently received rating region table when the current system time is after the effective time interval of the version number.

10. The digital television receiver of claim 9, wherein the controller further detects a first difference between a version number of a first rating region table received through a first channel and that of a second rating region table received through a second channel, detects a second difference between that of the first rating region table and that of a pre-stored rating region table and controls to replace the pre-stored rating region table with the first rating region table if both of the first difference and the second difference are within a predetermined range.

11. The digital television receiver of claim 9, wherein the controller further generates control signals to parse and store the subsequently received rating region table when the current system time is after the effective time interval of the version number and when the subsequently received rating region table is determined to be newer than a pre-stored rating region table based on their version numbers.

12. The digital television receiver of claim 9, wherein the controller further generates control signals to discard the subsequently received rating region table when the subsequently received rating region table is determined to be not newer than a pre-stored rating region table based on their version numbers.

13. The digital television receiver of claim 9, wherein the effective time interval of the version number represents a time interval after which a use of the rating region table is permitted.

14. The digital television receiver of claim 9, wherein the effective time interval of the version number is represented by a number of global positioning system (GPS) seconds derived from a coordinated universal time (UTC).

15. The digital television receiver of claim 9, wherein the effective time interval of the version number is represented by year, month, and day.

16. The digital television receiver of claim 9, wherein the at least one effective time field is included in a descriptor within the master guide table.

* * * * *